United States Patent [19]
Sampson et al.

[11] 3,802,098
[45] Apr. 9, 1974

[54] METHOD AND APPARATUS FOR SITUATION/DECISION TRAINING

[75] Inventors: Herbert F. Sampson, 1604 Newport Blvd., Costa Mesa, Calif. 92627; Stephen D. Sampson, Costa Mesa, Calif.

[73] Assignee: said Herbert F. Sampson by said Stephen D. Sampson

[22] Filed: Sept. 29, 1972

[21] Appl. No.: 293,685

[52] U.S. Cl. .............................. 35/25, 273/102.2
[51] Int. Cl. ............................................. F41g 3/00
[58] Field of Search .... 35/25, 22; 273/102.1, 102.2, 273/105.1

[56] References Cited
UNITED STATES PATENTS

| | | | |
|---|---|---|---|
| 3,411,785 | 11/1968 | Molina et al. | 273/105.1 |
| 2,710,754 | 6/1955 | Varney | 273/101.1 |
| 3,550,941 | 12/1970 | Spiro et al. | 273/102.2 R |
| 2,342,417 | 2/1944 | Mandell | 273/105.1 |
| 3,690,661 | 9/1972 | Scharz et al. | 273/102.2 R |
| 2,404,653 | 7/1946 | Plebanek | 273/101.1 |
| 2,957,695 | 10/1960 | De Valle Arizpe | 273/101.1 |
| 3,529,828 | 9/1970 | Thalmann | 273/102.2 A |

*Primary Examiner*—Robert W. Michell
*Assistant Examiner*—J. H. Wolff
*Attorney, Agent, or Firm*—Edward F. Jaros

[57] ABSTRACT

An apparatus and method providing a system which realistically presents a simulated situation including a sequence of acts to which a desired trained reaction of a participant or trainee is obtained, evaluated and adapted for study and analysis. The simulated situation is presented so that the trainee is part of the situation and his reactions thereto are recorded to facilitate his training. The apparatus includes a means for projecting a simulated situation involving a sequence of acts on a screen means provided with bullet impact sensor means, both as to the time of the bullet impact and location thereof. Each scene of the simulated situation is programmed, a computer-memory unit is provided with the programmed information with respect to each scene, whereby the bullet impact and its location on the screen means is converted into an electrical signal transmitted to the computer memory device for comparison with the programmed instructions and from which comparison information is visually displayed or recorded on a card to indicate selected time elements involved with respect to the scene, alertness of the participant, accuracy of the shot fired, and the relationship of the participant's reaction to the total scene being projected. A realistic training system in terms of virtually the whole environment under which the participant must act. A motion picture projector means provided with film strip stop means actuated in response to the impact of a bullet on the screen means and adapted to stop the film strip at virtually the film frame being projected at the time the bullet struck the screen means. A screen means having a replaceable screen surface and having bullet stop means arranged to divide the projection screen area into a plurality of bullet responsive incremental areas, each of said incremental areas being electrically connected to a memory device for comparison with programmed instructions therein.

21 Claims, 20 Drawing Figures

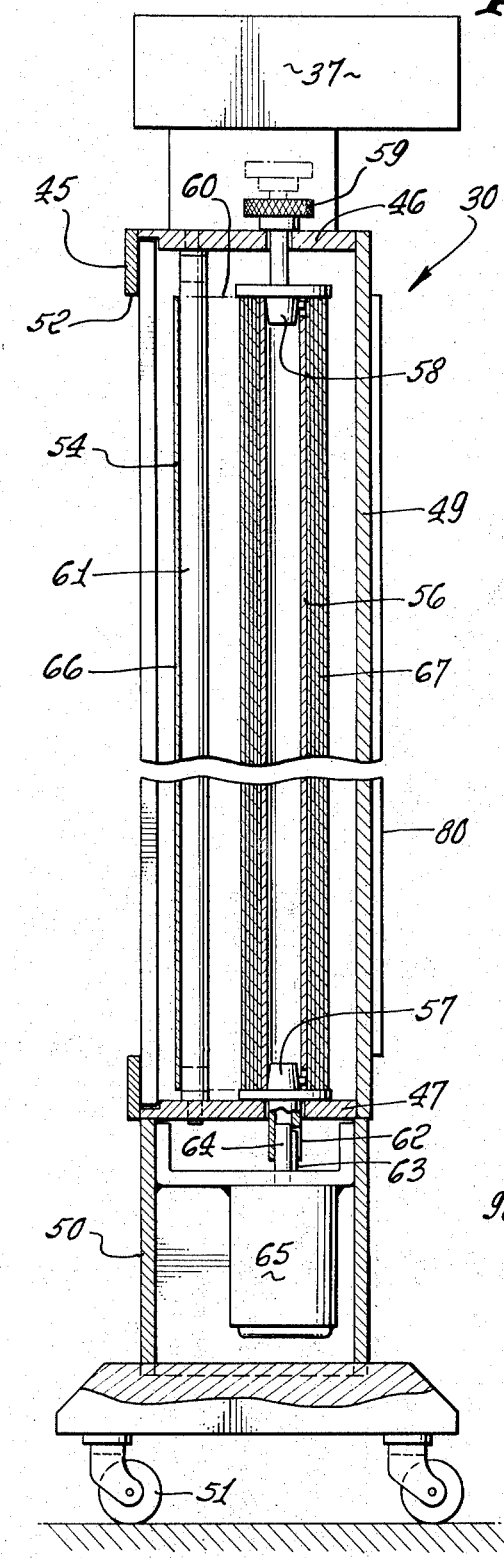

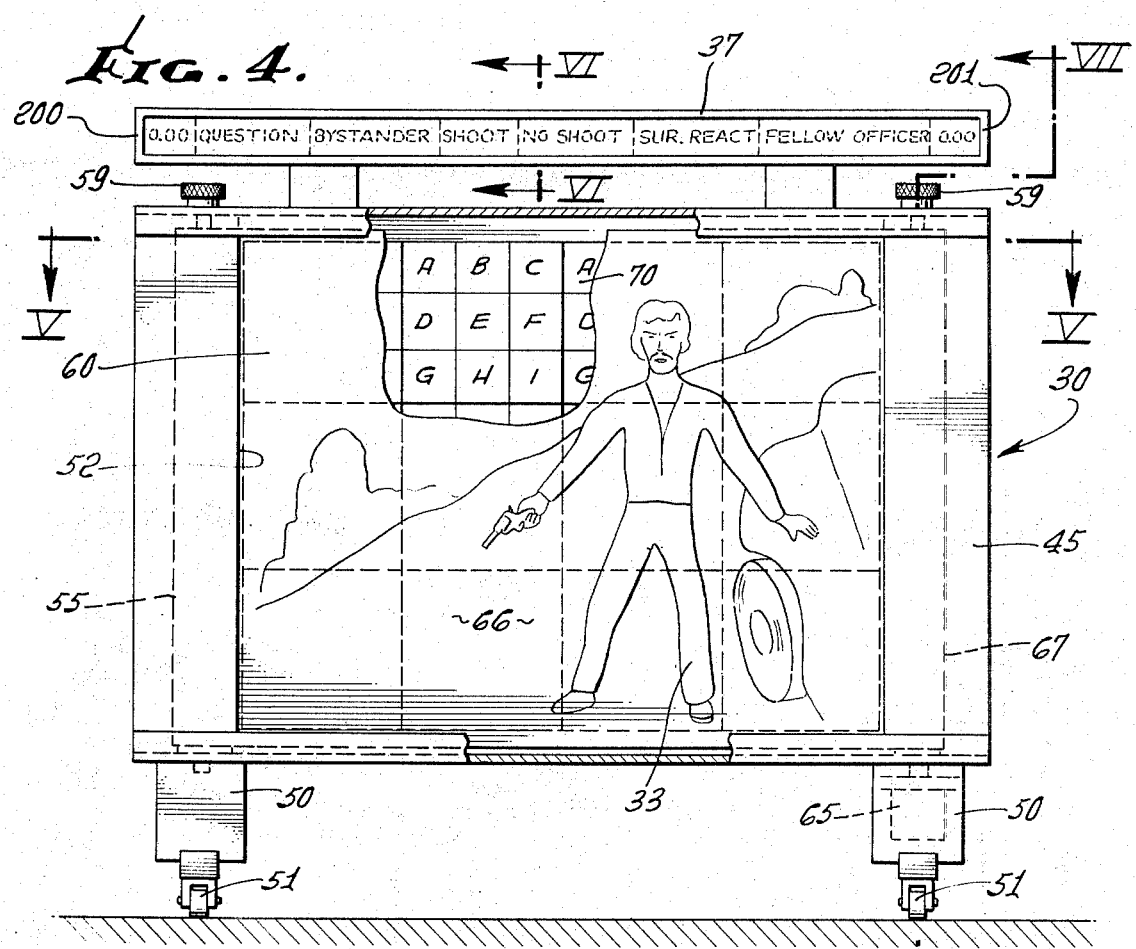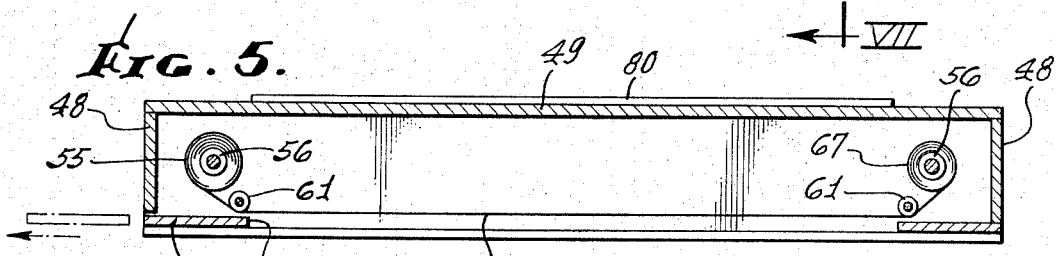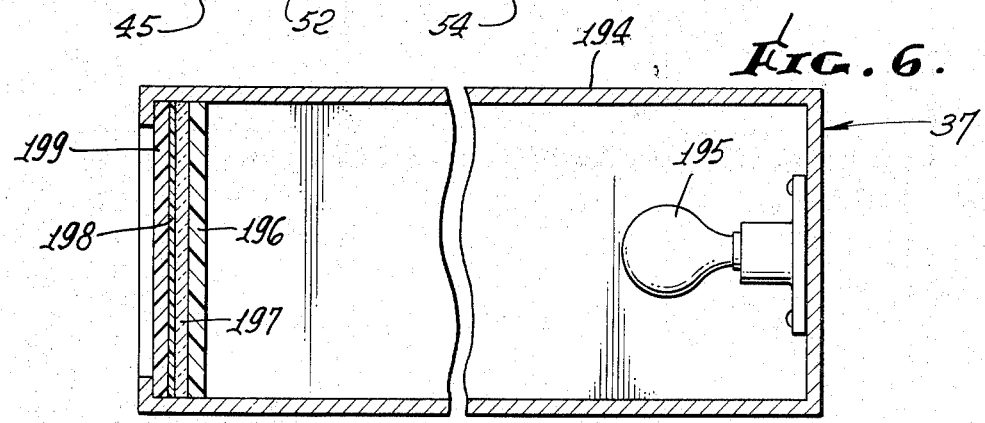

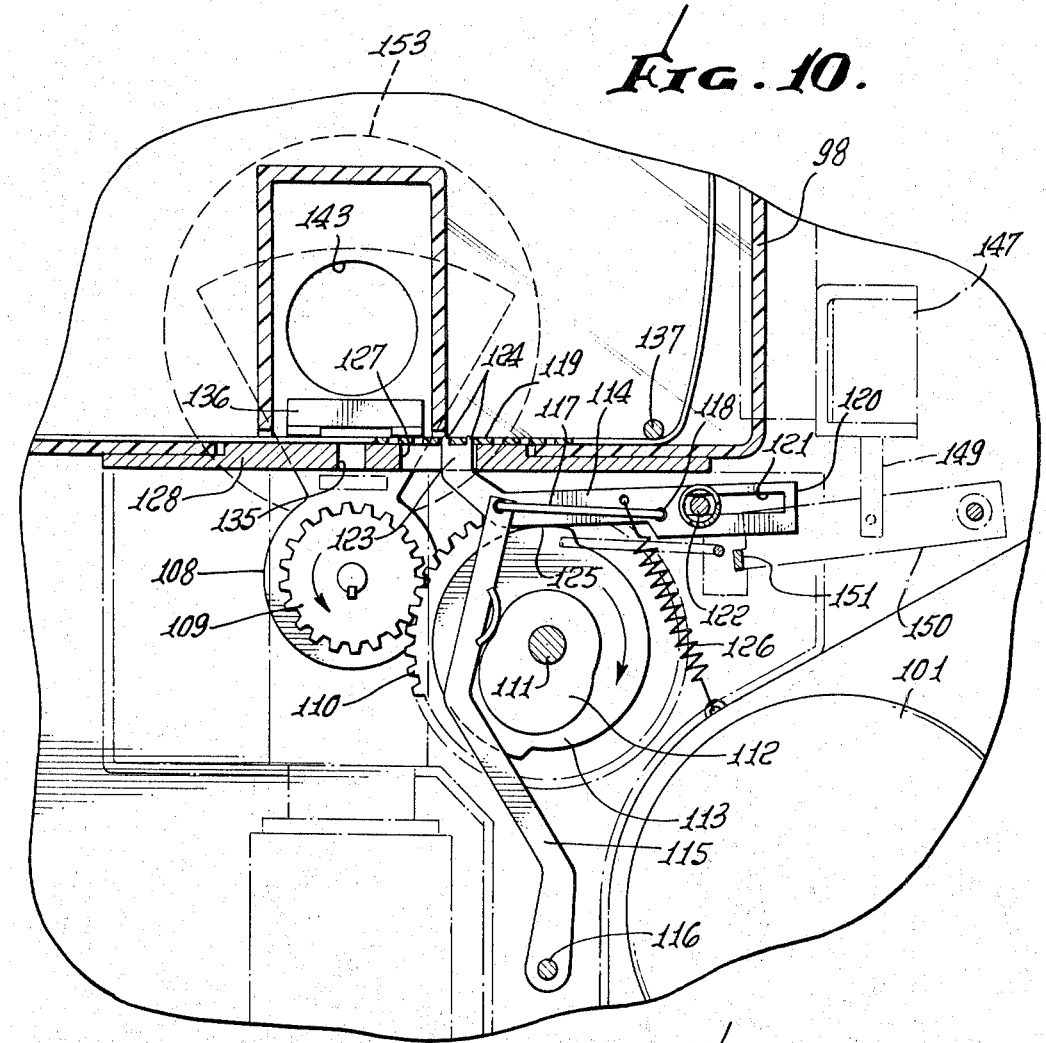
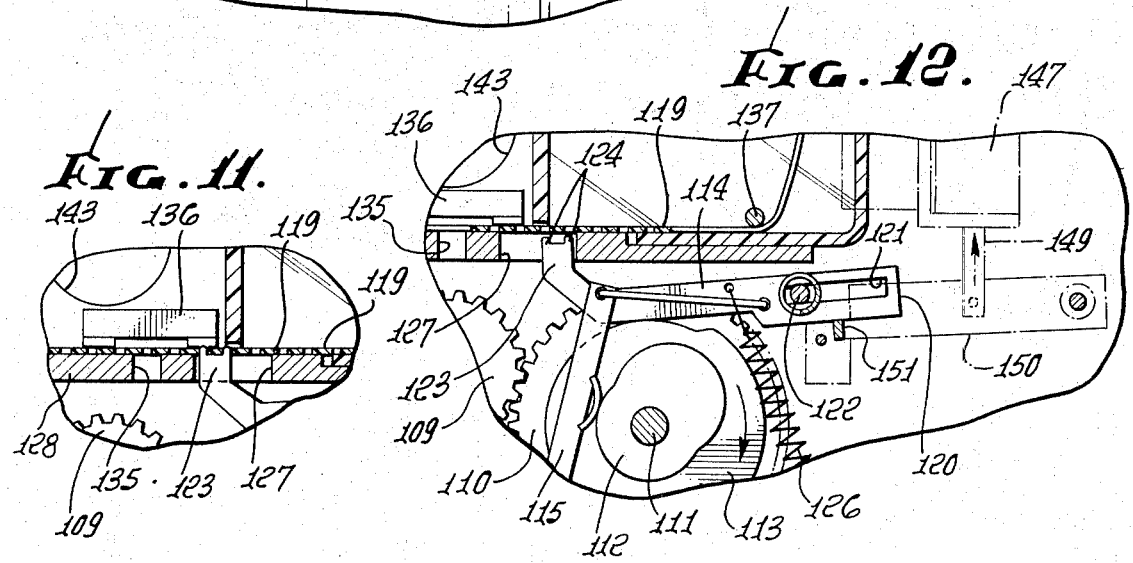

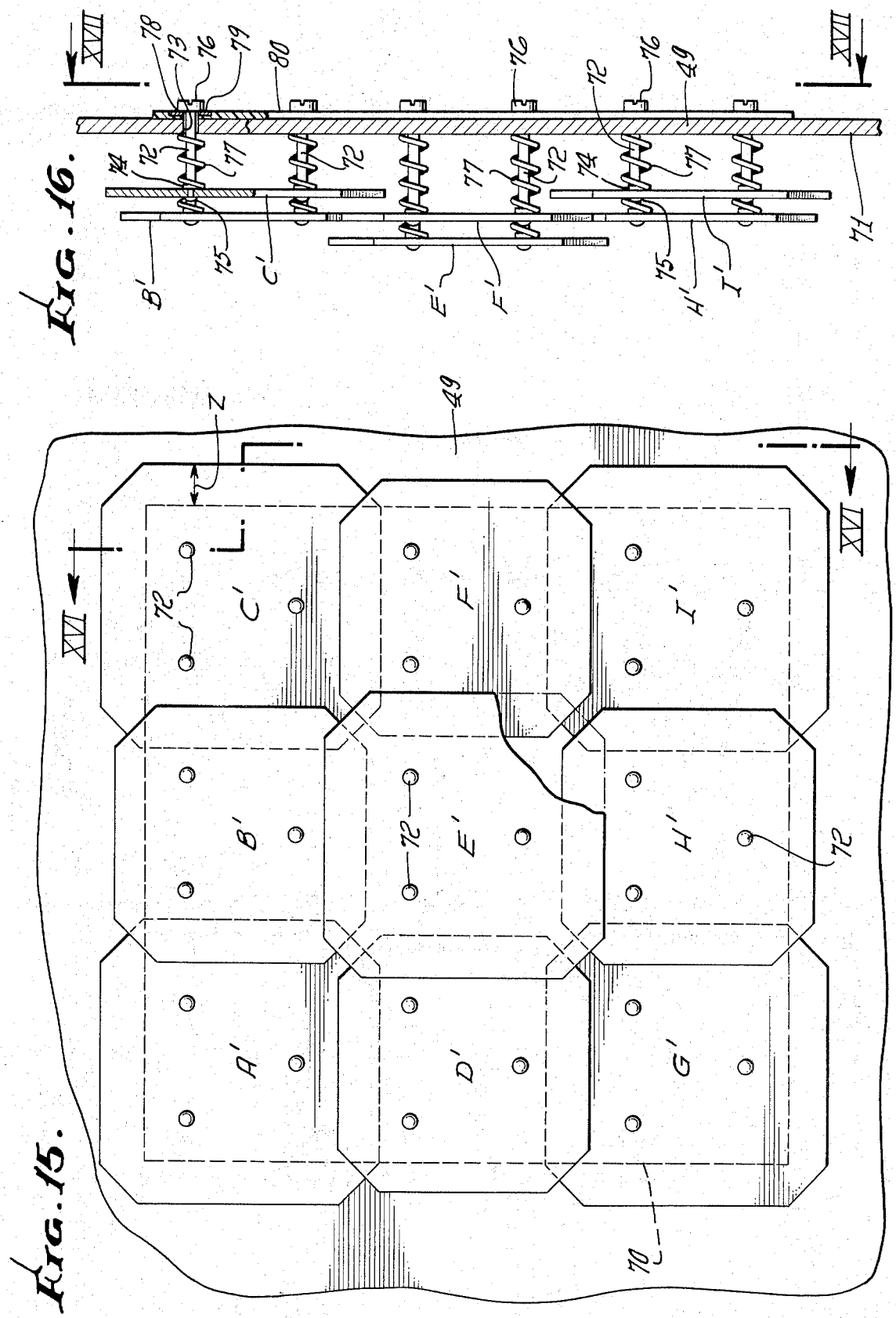

Del Mesa Police Dept.
Officer JOHN DOE
Employee # 1089
Badge # 24
R.J. # 1128
Date on range 9/15/71

| SEQ. | SHT. | ACC. | ALT. | DEC. | TOTAL |
|---|---|---|---|---|---|
| 10 | 10 | 86 | 84 | 81 | 251 |
| 10 | 1 | 9 | 8 | 9 | 26 |
| 9 | 1 | 8 | 9 | 7 | 24 |
| 8 | 1 | 8 | 8 | 9 | 26 |
| 7 | 1 | 9 | 8 | 7 | 24 |
| 6 | 0 | 10 | 9 | 9 | 28 |
| 5 | 1 | 7 | 9 | 8 | 25 |
| 4 | 1 | 9 | 10 | 9 | 28 |
| 3 | 2 | 8 | 8 | 7 | 23 |
| 2 | 1 | 9 | 8 | 8 | 25 |
| 1 | 1 | 9 | 7 | 8 | 24 |

FIG. 20.

TOTAL ENCODING FRAME LENGTH 31 FRAMES

METHOD AND APPARATUS FOR SITUATION/DECISION TRAINING

BACKGROUND OF INVENTION

Methods of training police, security officers and other persons required to act in situations which may involve their injury or death or require a desirable properly trained reaction thereto have included indoor and outdoor weapon firing ranges using still and moving targets set against a suitable background primarily designed for protection from live ammunition. Such prior proposed firing ranges were usually quite barren except for equipment at the target location and at the firing position. Such prior proposed range environment was generally completely unlike the surroundings in which a trainee may find himself during an actual situation.

The act of firing a weapon on a firing range is usually a very different experience than the act of firing a weapon under an actual live situation involving the presence of other persons, traffic, varying background appearances with respect to high and low illumination, and usual and unusual sounds which normally occur during an actual situation. The entire environment surrounding a participant in an actual situation may distract, interfere with, and affect in many variable ways the decision which must be made by the participant such as an officer, as to whether he should draw his revolver and shoot or not shoot. In actual situations such a participating officer becomes trained by experience, but evaluation of an actual situation is difficult because of the lack of precise data and information as to what actually occurred.

It is desirable in order to make training as real as possible, to provide a system in which a real situation is quite accurately reproduced and simulated and in which the trainee or participant can readily acclimate himself to the role of an actual participant and react accordingly. Such a desirable simulated situation includes visual and audio representations of actual scenes or series of acts which might be encountered in a real actual situation. Such simulated situations may be preplanned, programmed to include a desired standard of action, and provided with means whereby the reaction of the trainee may be readily compared both visually and by a printed score card with a preselected standard of action.

Prior proposed training systems have usually primarily dealt with a determination of the accuracy of the firing of the weapon. The question of whether the weapon should be fired or not fired or whether the weapon was fired too soon or too late, or an evaluation of the factors of the presented scene as to the decision making process involved in the final act of firing or not firing a weapon has not been employed in prior proposed training systems known to us.

SUMMARY OF INVENTION

The present invention therefore relates to a novel method and apparatus to practice said method wherein a selected simulated situation is presented in an environment of which the trainee becomes a part and wherein the decision process of the trainee as a participant in the action is obtained and compared against a selected standard or norm. The present invention contemplates a training system involving situation/decision elements in which the trainee is in an environment in which he may readily feel that he is an actual participant in the simulated situation.

Generally speaking, the present invention contemplates a method of training in which the trainee's response to preseleced simulated situations of a selected activity is obtained and recorded. The method includes the projection of a simulated situation on a screen means and in which a series of acts are performed. The film means providing the simulated situation is encoded to provide a time reference for such sequence of acts. The screen means is provided with a novel construction whereby the impact of the bullet fired during the projection of the series of acts will cause immediate stoppage of the film so that the frame shown on the screen means will be essentially that frame at which the trainee shot. The location of the impact of the bullet is sensed by the screen means and such bullet impact produces a signal which is fed to a memory device provided with instructions relating to the scene being projected so that with respect to time and to location of the bullet impact, relevant information may be displayed on a display module near the screen means or printed on a score card by a suitable print-out device. The close correlation between the programming of the sequence of acts provided on the film strip, the immediate stopping of the projector means upon bullet impact, and the immediate comparison of the time and location of the act of firing with respect to the scene actually depicted at the moment of firing together with the various elements being depicted in the scene provides an information means which permits the highly effective analysis and evaluation of the trainee's reaction to the simulated situation.

The primary object of the present invention therefore, is to disclose a novel method and apparatus for use in an effective training system which closely approximates a real experience.

An object of the present invention is to disclose and provide a method of training wherein factors relating to decision-making process involved in the playing of a sequence of acts of a simulated situation are readily subject to study and evaluation.

Another object of the present invention is to disclose a projector means provided with means for stopping a film strip therein on a particular film frame.

Another object of the present invention is to disclose and provide a motion picture projector means adapted for use in such situation/decision training system wherein the means for advancing the film strip in the projector means is modified to permit immediate stoppage of the film at a film frame.

Another object of the present invention is to disclose and provide a screen means for use in a situation/decision training system as described above wherein said screen means includes a readily replaceable screen surface adapted to be supplied from a supply roll of paper sheet material and to be drawn or taken up on a take-up reel whereby an unbroken screen surface may be presented at the beginning of each sequence of acts of a series of simulated situations.

Another object of the present invention is to disclose and provide a screen means for use in a situation/decision training system wherein a plurality of incremental area impact plates are positioned behind a screen surface and are adapted to sense the impact of a bullet passing through a corresponding incremental area of the scene projected.

A further object of the present invention is to disclose and provide a novel screen means including circuit means for each incremental area whereby impact of a bullet against said impact area will produce an electrical signal as to location of the bullet impact.

A still further object of the present invention is to disclose and provide a novel apparatus and method for situation/decision training wherein sequence of acts in a scene are programmed and are compared with the time and location of the firing of a bullet by the trainee for evaluation of the trainee's reaction to the scene being shown.

In the drawings:

FIG. 1 is a perspective view of apparatus embodying this invention and arranged to practice the method of the invention and showing in perspective a screen means, a projector means, a console for control of the apparatus, and a participant reacting to a simulated situation on the screen.

FIG. 2 is a perspective view of a projector means employable in the arrangement shown in FIG. 1.

FIG. 3 is a fragmentary view of a film strip bearing scenes of a simulated situation and having a suitable code thereon.

FIG. 4 is a front enlarged elevational view of the screen means shown in FIG. 1, the view including portions broken away to better show the screen structure.

FIG. 5 is a horizontal transverse sectional view taken in the plane indicated by line V—V of FIG. 4.

FIG. 6 is an enlarged vertical transverse sectional view taken in the plane indicated by line VI—VI of FIG. 4.

FIG. 7 is an enlarged sectional view taken in the planes indicated by line VII—VII of FIG. 4.

FIG. 10 is an enlarged fragmentary sectional view taken in the plane indicated by line X—X of FIG. 9.

FIG. 11 is an enlarged fragmentary sectional view taken in the same plane as FIG. 10.

FIG. 12 is an enlarged fragmentary sectional view taken in a plane similar to FIG. 10 and showing the stop means in retractive position.

FIG. 15 is an enlarged fragmentary elevational view of the screen means with screen surface removed as indicated in FIG. 4.

FIG. 16 is a sectional view taken in the planes indicated by lines XVI—XVI of FIG. 15.

FIG. 20 is a schematic chart of a film encoding table.

Figure 19:
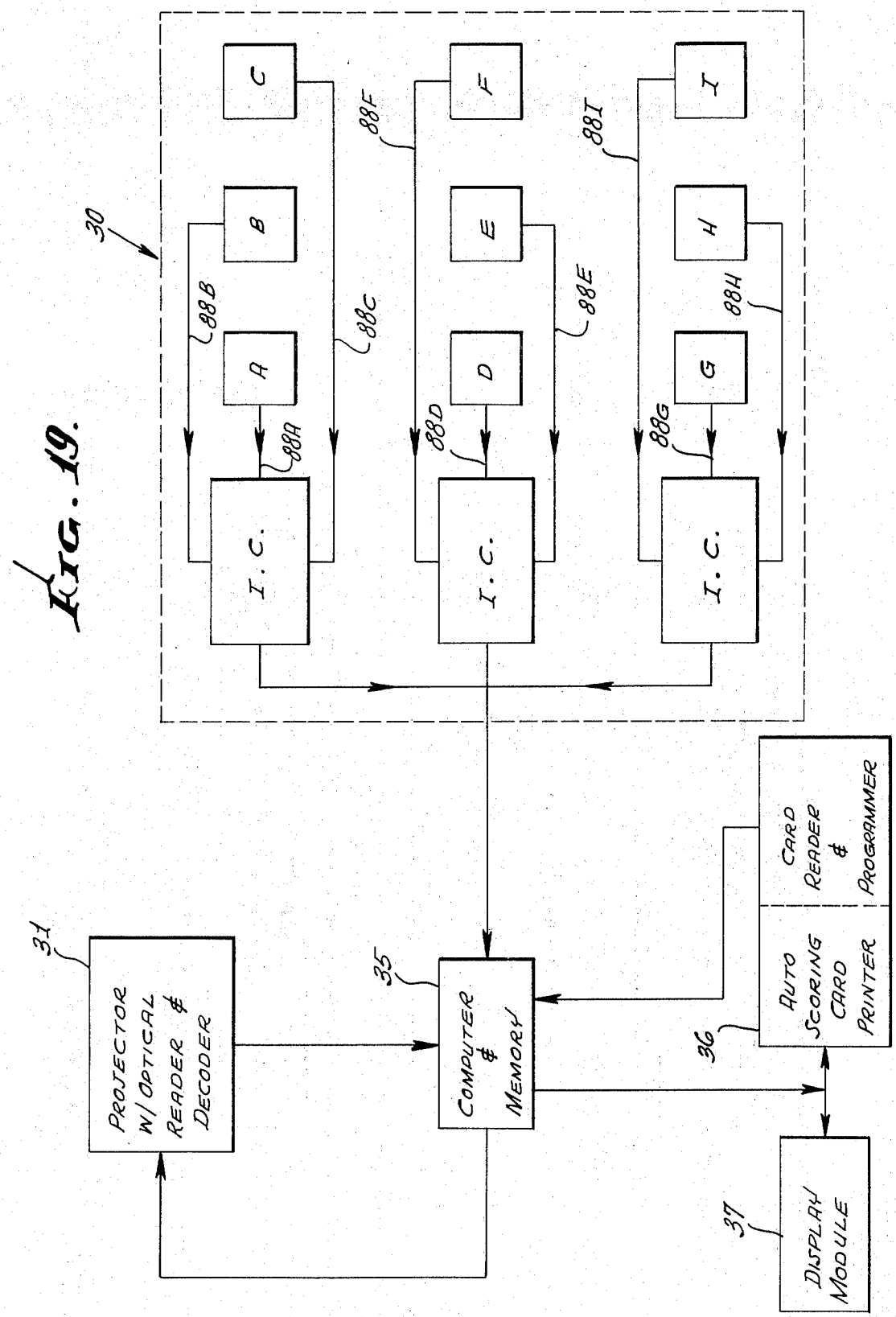
FIG. 19 is a schematic view of a situation-decision apparatus and arrangement embodying the invention.

Referring first to FIG. 1 and FIG. 19 apparatus for practicing the training method of this invention generally includes a situation screen means generally indicated at 30, a projector means 31 provided in a projection-electronics control module 32 for projecting a scene 33 on the screen means, and a master control console 34. The master control console 34 includes and is operatively associated with a computer and memory means 35 which includes and is operatively connected with an automatic scoring card printer 36 and a visual display module 37 which may be above the situation screen means. The projector and electronics control module may include an audio means, not shown, in order to provide expected and unexpected sound effects associated with the scene being displayed to lend audio realism thereto. FIG. 1 also illustrates use of a video tape projector module 38 which may be operatively connected and controlled through the master control console 34 by a video tape recorder module 39, it being understood that the video tape system is an alternate arrangement for projection of selected situations on the display means. FIG. 1 also illustrates a trainee 40 or participant reacting to the scene being displayed and under circumstances wherein the trainee becomes virtually a part of the simulated situation being displayed.

Generally speaking, the training system embodying the method of the present invention includes the projection on the situation screen means 30 of a simulated situation including a series or sequence of acts such as the stopping of a vehicle, opening of the car door, a person stepping out of the car door and then drawing a weapon and falling to the ground, and in which all of this action occurs in a normal street environment which may include the presence of other moving automobiles and pedestrians and movement or action by a fellow officer. The sequence of acts are provided a time reference with respect to the scene displayed and also to the initiation of the scene sequence, such initiation being under the control of an instructor at the master control console 34 or under automatic control means not requiring the presence of an instructor. The time reference of a sequence of acts is programmed with respect to each significant act depicted in the scene so that when the trainee 40 reacts to the situation his reaction will be obtained with respect to such time reference and his overt action, as evidenced by the firing of a bullet at the scene, or not firing will be identified and measured by the immediate time and location of the hit, miss or fault resulting from the firing of the weapon and/or the impact or lack of impact of one bullet on the screen means. The reaction of the trainee is displayed on the visual display module 37 immediately above the scene 33 in terms of preaction; action; post action with reference to time; hit, miss or fault with respect to location of the hit; and questionable, surrounding circumstances, or presence of a fellow officer with respect to environmental conditions at the time of reaction and firing of the weapon. This information may be also recorded in the computer and memory means 35 in order to provide a card print-out 41, FIG. 18 of the trainee's performance. Apparatus which provides such a realistic training system and which includes special features to effectively practice the method of this invention will now be described in detail.

Situation Screen Means

The situation screen means 30 may include a rectangular framework 45 comprising top and bottom walls 46 and 47 and end walls 48 and a specially constructed steel back wall 49 serving as a bullet stop and locating means as later described. The framework 45 may be movably supported on end legs 50 which may be of hollow box section and which may be provided with suitable casters 51. The front of framework 45 is provided with a rectangular opening 52 having a selected aspect ratio to define the boundaries of a projected motion picture frame. Preferably, the top, bottom and side margins of the opening may be adjustable so that the width and height of the projected image may be properly framed in view of space requirements which may limit the distance at which the projector means may be spaced from the screen means. Such adjustable framing means for a projected picture are well known and are not shown. Preferably the width and height of the projected image is approximately life-size to help promote the feeling by the participant that he is a part of the simulated situation projected on the screen means.

Framework 45 carries a projection screen 54. Screen 54 may include a suitable roll 55 of plain white paper such as butt end rolls of newspaper print. Roll 55 normally includes a hollow core 56 which may be readily sleeved over an upstanding rotatable stub shaft 57. An axially movable top retainer stub shaft 58 is carried by top wall 46 and is provided with a top knurled member 59 to facilitate turning and lifting the stub shaft 58 during placement and replacement of a roll 55 of paper. A paper sheet 60 from roll 55 is drawn over idle guide rollers 61 for securement and take-up by a core 56 at the opposite end of the opening, core 56 being supported by stub shafts 57 and 58 similar to those described at the supply roll 55. The bottom stub shaft 57 at take-up reel or end of the screen may be suitably slotted at 62 to receive a key 63 on a motor shaft 64 of a driving motor 65 suitably supported in associated leg 50. The sheet of paper stretched between the idle rolls 61 provides a screen surface 66 upon which scenes of simulated situations may be projected. The sheet of paper providing the exposed screen surface is subject to damage upon the firing of a weapon, such as a pistol, at images projected upon the screen and must be changed for each scene or sequence of acts forming a simulated situation. For this purpose, driving motor 65 is operably connected with and correlated with the film providing several scenes being projected upon the screen by the motion picture projector 31 so that before a new scene is projected upon the screen the damaged screen surface which has been pierced by a projectile or bullet will be wound upon the take-up core 56 at 67 so that an unbroken clean screen surface will be in position for the projection thereon of the next simulated situation scene.

The walls of framework 45 are preferably made of a hardened material such as laminated board or tempered Masonite. The hollow space within framework 45 may serve as a bullet trap. In a preferred example, the situation display means is constructed of a material adapted to withstand the impact of bullets preferably made of wax and propelled by use of a primer propellant. Such use of wax-type bullets for training and range practice is well known and is desirable because of the convenient, inexpensive use of such equipment indoors without special materials or space requirements. It will be understood however that the apparatus and method of this invention may be practiced with standard bullets of metal and using gun powder for a propellant in the event it is desired to utilize heavier and bullet-proof materials which will adequately stop and trap bullets and fragments thereof on such a range.

Bullet Impact Location Means

As generally mentioned heretofore, the location of the impact of a bullet when fired at a scene involving a sequence of acts of a simulated situation, includes a special construction of the steel back wall which is best understood by referring to FIGS. 4, 15, 16 and 17. In FIG. 4 a portion of the paper sheet 60 having the screen surface 66 thereon is broken away to generally illustrate a grid arrangement provided behind the paper sheet 60. In this example the area of the screen upon which a scene is projected is divided into a grid work of squares of suitable size, in this example the grid work is three squares in height and four squares in width, each square being about one square foot. Behind each grid square is a grid work of impact-sensitive plates identified for each square of the grid by letters A-I inclusive, each lettered square providing a further subdivision of the area of one of the grid squares.

In FIGS. 15 and 16 the subdivided grid square is shown in greater detail than in FIG. 4. In FIG. 15 the original grid square is indicated at 70 by dotted lines. Superimposed over this grid square area are a plurality of generally square metal plates identified by A'-I' inclusive and corresponding to the subdivision square areas A-I of FIG. 4. At each corner of a grid square are provided grid plates A', C', G' and I' each supported in spaced relation to the front surface 71 of the steel back wall 49 by three pins 72 which extend through pin openings 73 in triangular spaced relation in back wall 49. Each pin 72 includes a shoulder 74 upon which the back of the associated plate, A', C', G' and I' seats and is secured as by a suitable fastener 75 such as a nut, rivet, or the like. The opposite end of pin 72 includes a head 76 at the back side of back wall 49. A coil spring 77 is ensleeved over each pin 72 and seats against the opposed surfaces 71 of wall 49 and the back surface of the associated plate A', C', G' and I'.

Each of the corner plates A', C', G' and I' are of such size and area that they extend beyond the outline of the original marked grid square 70 as indicated by the distance Z. Covering the space between adjacent plates A', C', G' and I' are similar plates B', D', F' and H'. Each of plates B', D', F' and H' are similarly supported in spaced relation from the front surface 71 of wall 49 by pins 72 and coil spring 76 and are located in forwardly spaced relation to the corner plates A', C', G' and I'. At the center of the grid square 70 a single center plate E' is similarly supported by pins 72 in spaced relation to wall 49 and in still further forward spaced relation to the next rearwardly adjacent plates B', D', F' and H'. Thus as shown in FIG. 16 the area of the marked grid square 70 is covered by the plates A'-I' inclusive in an arrangement of spaced tiers wherein each plate is permitted rearward movement against the bias of the springs 72 upon impact thereagainst of a bullet or other projectile. Rearward movement of each plate is also accompanied by rearward movement of pins 72 through the pin openings 73 because of the seating of the plates on the shoulders 74 on pins 72.

As best shown in FIG. 15, each plate overlies or underlies an adjacent plate so that the area of the marked grid 70 is completely covered. It will be understood that the area to be covered by the original grid work 70 and the subdivided grid work represented by A-I inclusive may vary depending upon the degree of preciseness desired for location of the impact of the bullet. In a practical, workable example the marked grid 70 may be a 12 inch square and the subdivided grid thereof, A-I inclusive may constitute 4 inch squares.

Figures 17, 18:
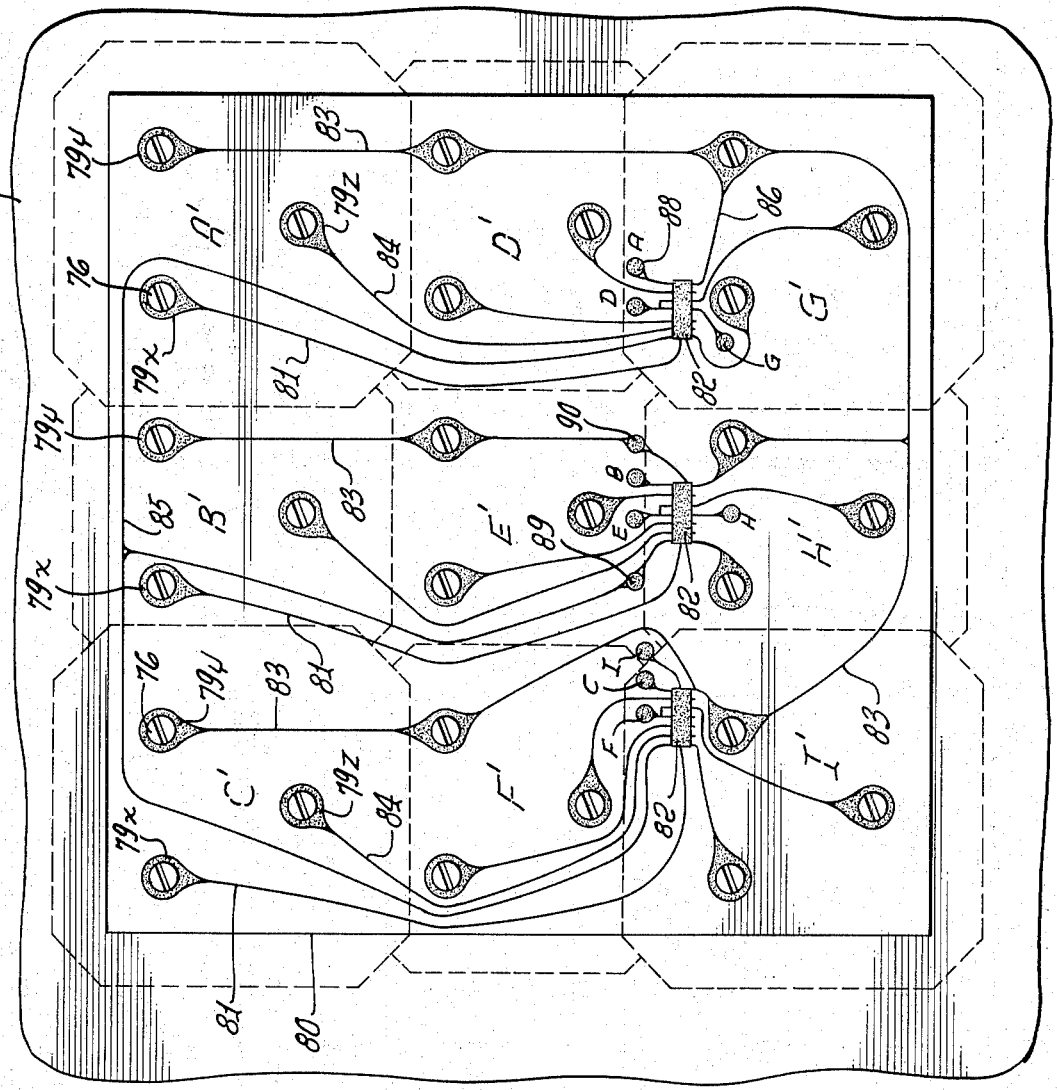
FIG. 17 is a back view of the fragmentary screen means shown in FIG. 15.
FIG. 18 is a plan view of a card for scoring the response of a trainee to a plurality of situations projected on the screen means.

As mentioned above, the impact of a bullet or projectile on one of the grid squares A'-I' inclusive will cause depression of the square and axial displacement of at least one of the pins 72. The head 76 of each pin lies on the back side of the wall 49 and normally is in electrical contact at 78 (FIG. 16) with an enlarged terminal face 79 provided on a circuit board 80 secured to the wall 49 in any suitable manner. Pin 72 shown in contact with the terminal face 79 is shown in FIG. 17 at the upper left thereof. Each of the pins 72 has a head 76 in contact with a terminal face 79 as described above.

Circuit board 80 is provided with a printed circuit arrangement best shown in FIG. 17. Three terminals provided for each grid plate A'-I' inclusive are provided with the same reference numerals and faces are further identified by X, Y, and Z. Thus terminals on grid plate C' are indicated by 79 X, 79 Y, and 79 Z. Each of the terminals 79 X of each grid plate is connected by a printed circuit lead 81 to a terminal bar 82. Each of the terminals 79 Y of the grid plate are connected by printed circuit leads 83 in series to each of the terminal bars 82. Each of the terminals 79 Z are connected by printed circuit leads 84 to terminal bar 82 of the vertically disposed group of grid plates such as C', F', and I'. The terminal bars 82 are electrically connected by a printed circuit lead 85. Leads 81 of each of the vertical group of grid plates are connected by leads 86 to their respective terminal leads. Each terminal bar 82 is provided with an outgoing terminal connection for the group of three grid plates associated therewith, such outgoing terminals being identified by reference numerals 88 A – 88 I. At terminal bar 82 provided adjacent the center of circuit board 80, input power leads 89 and 90 are provided for energizing the printed circuits. Thus it will be apparent that upon rearward displacement of a head 76 of a pin 72 caused by impact of a bullet against a grid plate A'-I' inclusive that the normal electrical contact between head 76 and terminal 79 will be broken, a signal is made that the bullet has struck that particular plate, and the signal will be transmitted to the computer and memory system 35. It will be also apparent that as soon as the bullet impact force is dissipated, the grid plate which has been struck will return to its normal forwardmost position.

It will be thus noted that the paper screen surface 66 is normally smooth and unbroken so that the projected situation scene may be reproduced thereon with desired photographic uniformity and illumination. Each incremental area of screen surface 66 is provided with a corresponding incremental bullet sensitive impact area on plates A'-Z' directly behind surface 66. As a scene is projected upon the surface 66, each incremental scene area also has a corresponding incremental bullet impact area on said plates A'-I' and thus as the action in a scene moves across the surface 66, the corresponding plate impact areas may be electronically programmed to identify hit, miss, fault or other significant information on the scene. Such programming is correlated to the film frames as further later described.

Projection System

Projector means 31 may be of any suitable make and manufacture and in this example is a Technicolor 1000,8 mm projector using a continuous film loop cartridge. The lens system may be a standard or wide angle system depending upon the available space between the projector lens and the screen means, the size of the images projected upon the screen being so correlated with respect to the position of the trainee from the projected simulated situation so that the proper impression of distance of the trainee from the projected images may be virtually the same as if the scene were real. An example of a lens sytem utilizing standard lenses would provide an image screen area of about 4 feet by 5 feet. Use of an anamorphic lens could make the projected image area approximately 4 feet by 7 feet; an anamorphic lens being desirable in some training situations.

The projector means of this example includes certain modifications in order to enhance the method of training, such modifications including a means for instantaneously and accurately stopping motion picture film on one frame and preferably a frame or frame immediately proximate thereto at which the trainee fired his shot. Immediate stopping of the film is provided without loss of focus or brightness of the projected image. Since the stopped film is subjected to intense heat from the projector lamp, the projector means is further modified to provide suitable cooling for the film strip at the film gate.

Such modifications to projector means 31 are shown in FIGS. 8 to 14 inclusive. Projector means 31 generally includes a projector housing 95 having a lens means 96, a film cartridge opening 97 to receive therewithin a film cartridge 98 of continuous loop type, that is threading and unthreading of the film ends are not required. The projector housing 95 includes a top control panel assembly 99 having usual projector controls for starting and stopping the film, and regulating the brightness of the projector light by high and low controls, and other suitable projector controls. Detailed description of the parts of the projector other than the modifications which embody this invention will be minimized since the projector is of well-known make and manufacture.

In general, projector means 31 includes a motor 101 (FIG. 8) provided with a suitable drive 102 for rotating a film drive wheel 103 which frictionally engages film reel means 104. Motor 101 is also provided with a drive pulley 105 for driving the capstan 106. Motor 101 is also provided with a drive means 107 for driving shutter 108 which includes a gear 109 meshed with a larger gear 110 which drives cam shaft 111 upon which suitable cams 112 and 113 (FIG. 10) are rotated for actuation of film advancing claw member 114. Cam 112 is engaged by a cam follower arm 115 pivoted at 116 and carrying a link 117 connected at 118 to claw member 114 for reciprocal movement of claw member 114 parallel to the path of the film 119. End 120 of claw member 114 includes an elongated slot 121 within which slidably and pivotally loosely moves a mounting pin 122. The other end 123 of claw member 114 has a pair of upstanding fingers 124 spaced in accordance with the spaced perforations in film strip 119 to engage the film strip and to advance the film strip one frame at a time.

Claw member 114 is moved to and from the plane of the film strip 119 by cam 113 which is engaged by the lower edge of claw member 114 as at 125, said claw member 114 being biased downwardly by a suitable spring 126 connected at one end to the claw member and at its other end to a suitable housing portion. The end 123 provided with the spaced fingers or claws 124 moves in a slot 127 in housing wall portion 128.

Figure 8:
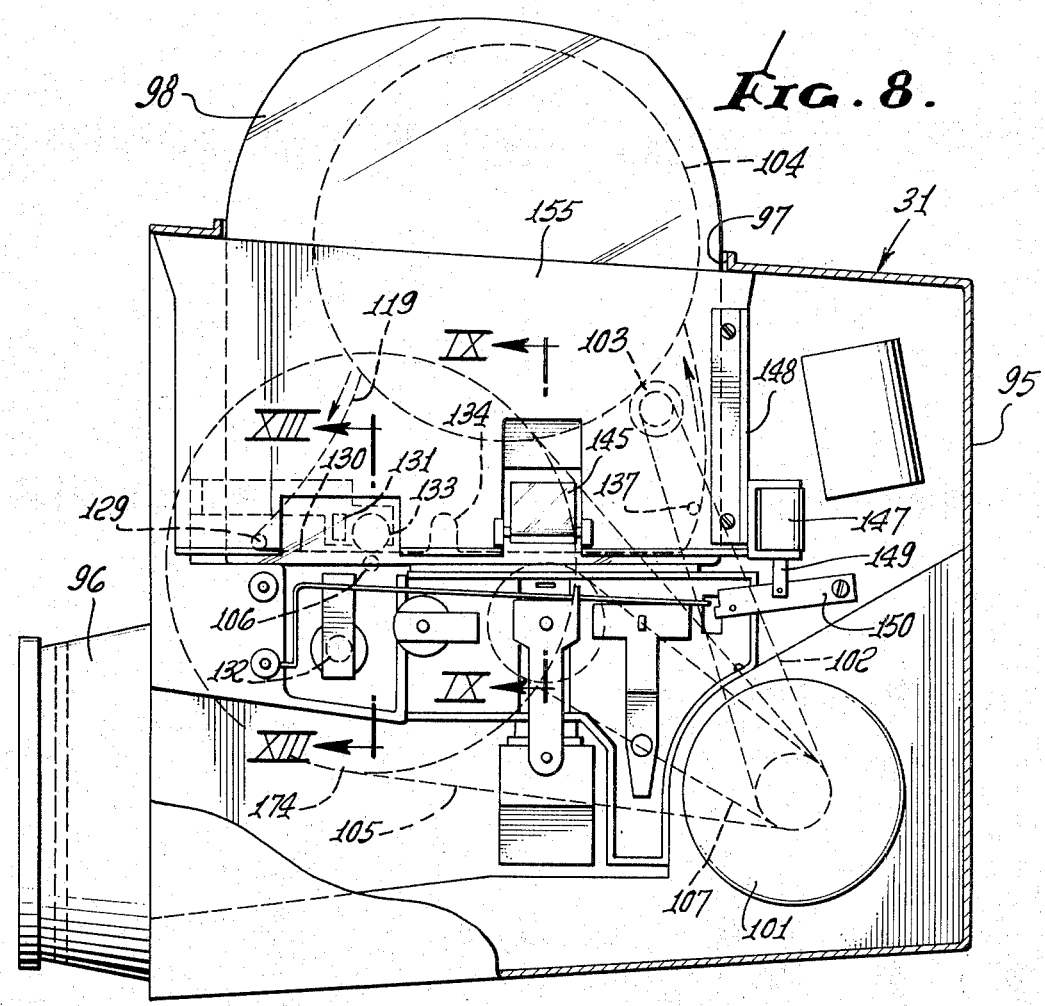
FIG. 8 is a top view of a projector means shown in FIG. 2, a portion of the top wall being broken away to show film stop motion means.
Figure 9:
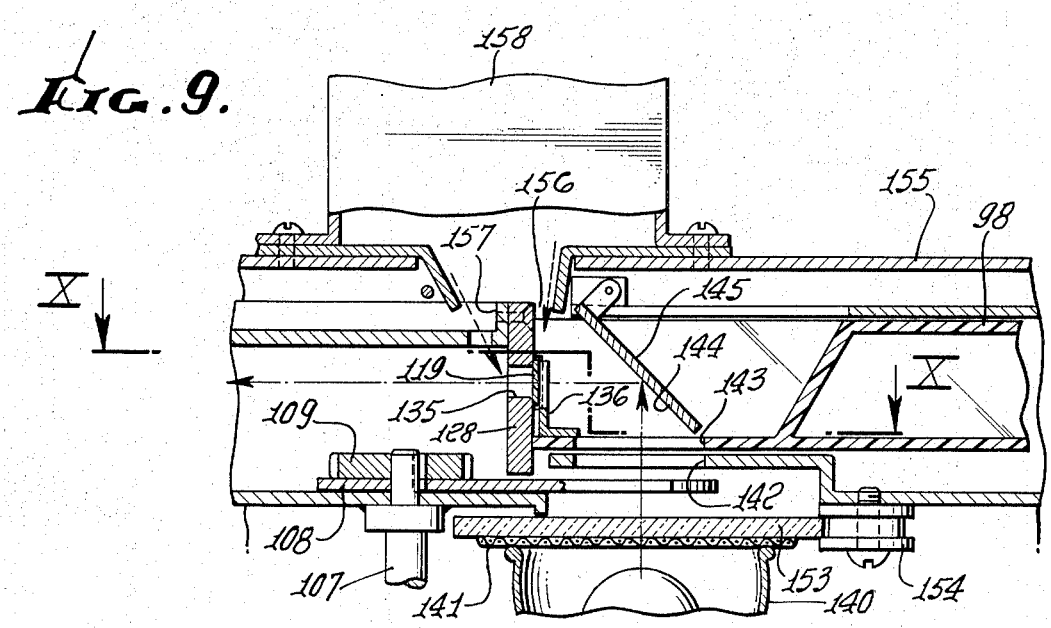
FIG. 9 is a fragmentary vertical transverse sectional view taken in the plane indicated by line IX—IX of FIG. 8.

Film 119 moves from cartridge 98 along a path indicated by arrows, FIG. 8, over an idle roll 129 to a straight path portion 130 which moves the film strip past a sound head 131 and photoelectric cell 132. A film roller 133 engages edge margins of film strip opposite capstan 106. A film loop 134 of suitable length is provided so that the portion of the film engaged by claw member 114 will not be under undue stress. Film strip 119 then passes across film gate 135 and is held in planar position thereat by a film holder 136. The film strip 119 continues to move along the straight path and is then passed around an idle roller 137 for return to the cartridge.

A projector lamp 140 projects a light beam through a suitable screen mesh 141, past shutter 108, and through optically aligned light ports 142 and 143 for impingement against a light reflective surface 144 which may be carried on a pivotally mounted plate 145 for directing the light beam through film 119 and film gate 135 to the lens means 96 for projection. It will be understood that the aforementioned description of the projector means includes an arrangement of well-known manufacture, namely, the Technicolor model 1000, 8 mm projector.

Means for stopping the film strip 119 on a frame and in response to a selected signal initiated by impact of a bullet on the screen may comprise a solenoid means 147 carried on a bracket 148 supported on housing means 95. Solenoid 147 includes a solenoid arm 149 pivotally connected intermediate ends of a pivotally mounted arm 150 having a transversely bent finger 151 which underlies end 120 of claw member 114. When solenoid means 147 is actuated by a signal as later described, solenoid arm 149 is drawn upwardly and finger 151 lifts upwardly end 120 of claw member 114 to cause pivotal movement thereof about pivot 122 as permitted by cam 113 to provide immediate withdrawal of claw fingers 124 from engagement with the perforations in film strip 119, as best shown in FIG. 12.

When the film is stopped, means are provided for preventing heat from lamp 140 from damaging the film strip 119. Such means includes a usual glass filter disc 153 which may be pivotally mounted at 154 for movement into and out of the light path of the lamp. However, in this embodiment of the invention since it is desired that the light level be as high as possible and that there be no lessening of the brilliancy of the image projected. The filter disc 153 is thus retained in a position out of the light path. Since absence of the filter disc 153 will permit heat to move along the light path and be reflected by mirror surface 144 to the film at the film gate, the upper wall 155 of the projector housing is modified to provide an opening 156 above the film 119 on the back side of the film gate, and an opening 157 on the front side of the film gate so that downwardly directed converging streams of air from an air blower means 158 may pass over front and back surfaces of the film strip 119 to provide necessary protective cooling.

Figure 13:
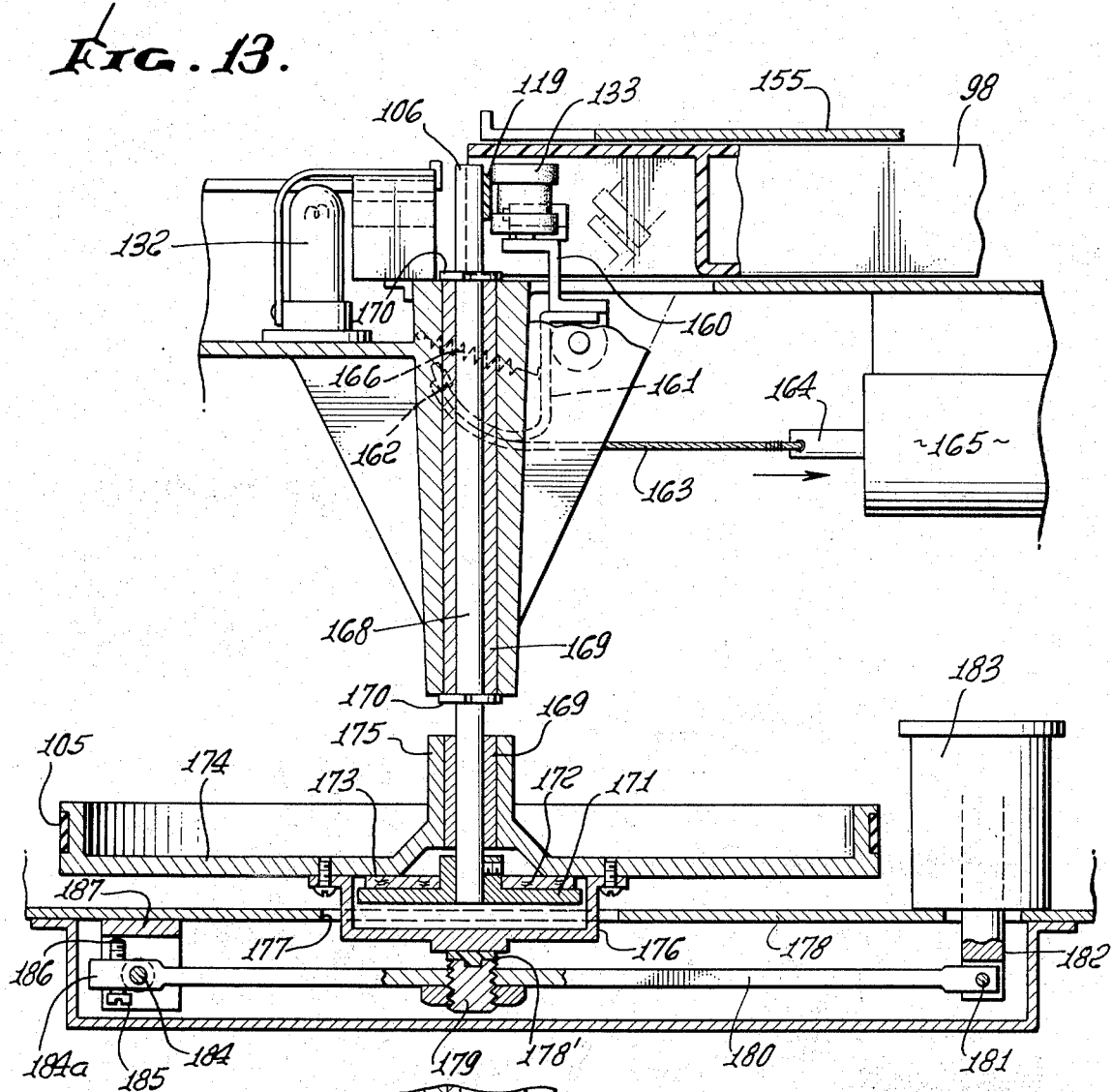
FIG. 13 is an enlarged vertical transverse fragmentary sectional view taken in the plane indicated by line XIII—XIII of FIG. 8.
Figure 14:
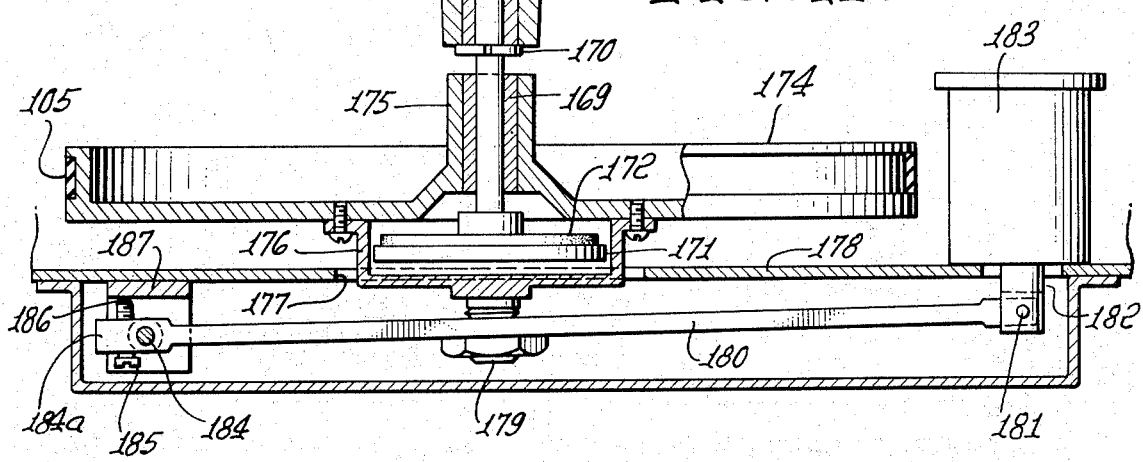
FIG. 14 is an enlarged fragmentary sectional view taken in the same plane as FIG. 13.

In addition to providing solenoid actuated means for disengaging claw member 114 from the film strip for stopping the film strip, it will be apparent that the capstan drive means must also be disengaged immediately so that the film does not partially further advance with respect to the film gate. Means for disengagement of the capstan drive is shown in FIGS. 13 and 14 wherein capstan 106 is in frictional engagement with film strip 119 as caused by biased film roller 133 suitably mounted on a pivoted bracket 160. Bracket 160 includes a depending and then laterally and upwardly curved member 161 which is connected at 162 to one end of a cable 163 connected to solenoid arm 164 of a solenoid 165. The solenoid arm is normally retracted to apply tension to cable 163 to hold roller 133 in frictional engagement with film strip 119. Upon projection of solenoid arm 164 and decrease in tension of the cable 163, the film roller bracket 160 is biased out of engagement with film strip 119 by a coil spring 166 connected at one end to depending bracket member 161 and at a separate end to an adjacent housing portion.

Capstan 106 includes a capstan shaft 168 mounted in suitable sleeve bearings 169 and is vertically positioned by top and bottom snap rings 170. The lower portion of capstan shaft 168 carries a clutch means 171 provided with a disc 172 of suitable clutch material such as cork. Disc 172 has frictional driving engagement at 173 with a capstan fly wheel 174.

Capstan fly wheel 174 is axially slidably carried on the lower portion of capstan shaft 168 by bearing 169 ensleeved within fly wheel hub 175. Secured to the bottom surface of fly wheel 174 is an upwardly facing cup-shaped housing 176 which extends through an opening 177 of a wall 178. Housing 176 is adjustably supported upon a resilient nylon bearing disc 178' carried on top of a threaded element 179 in threaded engagement with a link member 180. Member 180 is pivotally connected at 181 to the lower end of a solenoid arm 182 of a solenoid 183 supported on wall 178. The opposite end of link member 180 is pivoted at 184 and carries a threaded head 184a having an adjustment screw bolt 185 having its end adapted to seat at 186 against a face 187 on wall 178.

When solenoid 183 is actuated by a signal which causes film strip 119 to stop, solenoid arm 182 is retracted (FIG. 14) thus lifting capstan wheel 174 out of its frictional engagement at 173 with the capstan clutch 172. Thus the driving force rotating the capstan shaft 168 is immediately disengaged. The absence of a capstan driving force on the film and immediate disengagement of claw member 114 with perforations in the film strip, together with the frictional drag present in the entire film reel and advancing mechanism causes the film strip to stop.

As mentioned heretofore, the impact of a bullet on the grid plate of the screen means is transferred into an electrical signal by the circuit means on the back of the screen means and this signal also actuates solenoid 147 to immediately disengage claw member 114 with the film strip and also actuates solenoid 183 which disengages the capstan clutch drive means. Thus no forces are applied to the film strip which might tend to advance the film strip to frames depicting scenes other than that at which the trainee fired or reacted to. The disengagement of the capstan drive means with the film together with the simultaneous or slightly later disengagement of the claw member with the film leaves in position at the film gate a full film frame so that the scene being projected upon the screen is essentially that at which the trainee has fired.

Film Means

Film means 119 employed with this example of the invention is generally shown in FIG. 3 and may comprise a standard 8 mm or larger film strip provided with frames 190 and film sprocket holes 191 at one side of the strip, a sound track, not shown, if desired and opposite selected frames a code mark 192.

Figure 20:
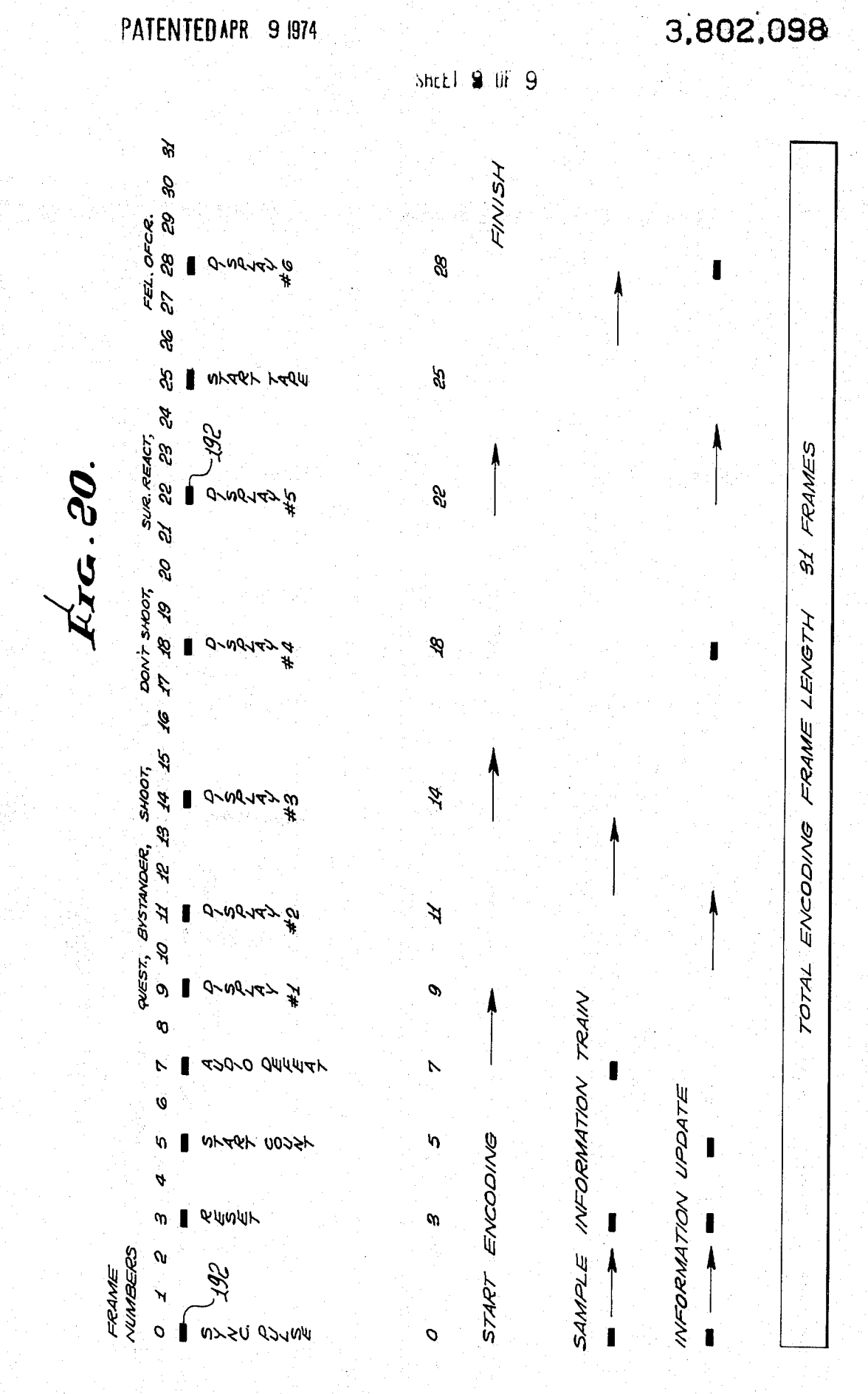

Code mark 192 is used to program the sequence of acts in a scene projecting the film strip. Code marks 192 may be read by photocell 132 and sound pick up head 131, FIG. 8–13. An exemplary scene on a film strip which comprises a sequence of acts may be encoded on the film strip as indicated in FIG. 20 wherein programming of the scene is shown by identifying frame numbers indicating location of code marks 192. It will of course be understood that the coding is exemplary with respect to the spacing between film frames and that on an actual film strip the space between code marks will depend upon the sequence of acts depicted in the film frames between the code marks.

In FIG. 20 a code mark 192 provided at frame 0 represents the start of a film strip and furnishes a synchronizing signal or pulse to the computer and memory means 35, to the automatic scoring card printer 36, and to the display module or any other associated accessory to the system. At frame 3 code mark 192 provides a reset signal which serves to place any of the associated devices in a start condition, such as sending new instructions to the memory means 35, canceling old instructions and initiating automatic briefing. At frame 5 a time reference count may be started which is correlated to the beginning of the scene being projected upon the screen. The time count is in progress after frame 5 and measures time in hundredths of a second from the beginning of a sequence of acts to that time interval in the scene designated as a proper time to shoot; that is a preaction time. After the designated action interval (shoot), postaction time is counted to determine how long after the "shoot" or action period the trainee reacted.

At frame 7, a code mark 192 may be employed to cut out an audio portion of the scene, if desired, or it may be used to introduce other audio effects. At frame 9, a code mark is placed on the film to designate that portion of the scene where the acts viewed are evaluated as inducing a questionable response by the trainee, that is, the trainee may or may not react by firing his weapon. At frame 11, the acts depicted on the scene may include the presence of a bystander which will also affect the response of the trainee. At frame 14, the code mark 192 designates the beginning of the sequence of acts, or action period, where shooting is a proper response. Frame 18 is marked to indicate a sequence of acts where the trainee should not shoot. At frame 22 code mark 192 on the film indicates the beginning of a sequence of acts where the trainee's reaction is too late. Frame 28 indicates the beginning of a sequence of acts which might involve a fellow officer. The film strip may also be marked as at frame 25 in order to restart an associated audio tape providing sound effects for the scene.

When the film strip is stopped by the bullet impact produced signal, a stop control means in the control console 34 maintains such stopped condition for a preselected time at the end of which the scene is completed. Manual override means may be provided for holding the stopped condition for a longer length of time to permit more extensive analysis of the scene and the trainee's reaction thereto. Such stop motion control is electronically well-known and is not described in detail.

After a film strip has been programmed and the memory means 35 has been furnished with such programmed instructions and the projector with the optical reader and decoder 31 is in operation, the frame marks 192 cause a signal to be transmitted to the memory means 35 so that when one of the grid plates, A'-I' inclusive is struck by a bullet, the signal sent thereby to the memory means 35 may be immediately compared with the programmed instructions and the result of such comparison transmitted to display module 37 which is visually observed over the screen means and also such comparison signal may be transmitted to an automatic scoring card printer 36 as later described.

DISPLAY MODULE

Display module 37 provides a visual score of the trainee's reaction to the particular scene as programmed as described above. Display means 37 comprises an elongated rectangular housing 194 on the back wall of which may be mounted a plurality of light sources 195 of suitable type and with sufficient brilliance to transmit light through an inner frosted white plastic panel 196, a color filter 197, a film plate 198 containing selected letters thereon, and an outer clear plastic panel 199. When a light source 195 is energized and illuminated upon signal from the sensory means as a result of the comparison of the memory means with the programmed scene, the display panel including the sections from "Question" to "Fellow Officer" is selectively illuminated and readily read by the trainee. At the left end of display module 37, FIG. 4, an end portion 200 is provided with a translucent surface upon which digital representations in hundredths may be projected by a small projector at the rear thereof, not shown, which is correlated by the time reference sequence as indicated on the film strip. Thus at end portion 200, digits 0.00 or other digital numbers will display the time interval preceeding the ideal shooting period as programmed on the film strip. At the opposite end portion 201 a similar digital display is made which gives the time the shot was fired after the ideal shooting period as programmed on the film strip. Thus if the shot is fired during the predetermined ideal shooting period, the digital display at end portions 200 and 201 would be 0.00 — 0.00. In the event the shot is prematurely fired, that is at some time ahead of the ideal shooting period, the display would show for example 1.26 — 000 which indicates that the shot was fired 1.26 seconds before the selected ideal shooting period. If the shot was fired too late, the display would show 0.00 — 0.92 indicating that the shot was fired at 0.92 of a second after the programmed ideal shooting period.

Thus the visual display means 37 permits the trainee to immediately know the result of his shot in terms of whether the shot was fired too soon or too late, whether at the time of firing the shot the situation was such that it could be questioned that a shot was proper. Whether the trainee's shot made a hit, a miss, or landed in a selected free area is clearly shown by the stopped scene and the hole in the screen surface. If a free area is hit, the stop motion of the film strip may be rendered inoperative so that the trainee may have a chance to take a second shot at the scene.

Automatic Scoring Means And Card Printer

Automatic scoring and card printer 36 may be associated with the apparatus described above in order to provide a permanent record of the comparison of the programmed film strip as projected upon the screen and the performance of the trainee. The automatic scoring and card printer 36 receives similar information signals from the memory means 35 as those described above with respect to display module 37. However, the score card is of somewhat different character than the display results and contemplates a further analysis of the trainee's performance.

In FIG. 18 an exemplary card is shown wherein the officer is identified by name, badge number, etc. and the date on which he has used the training system. In a training film there may be 10 action sequences which are identified in the first column starting from the bottom as one through 10. The second column identifies the number of shots fired, the third column the accuracy of the shots, the fourth column the alertness of the officer and the fifth column an evaluation of the decision made by the officer. The sixth column indicates the total score for each sequence and at the top of the ten sequences a cumulative score is shown for each of the column headings.

Accuracy scoring is based upon a positive hit in the prime target area, or a negative hit, and a free hit area. The grid plates A'-I' inclusive at the back of the screen means are programmed or correlated to the scene being projected at each instant of time and this information may be included in a cassette-type memory unit which is started by the film by code mark 192 at a preselected frame. The memory unit compares the signals coming from the 4-inch grid plates behind the screen to the information in memory on the tape. If a trainee fires and hits a prime target which would be a positive hit, this hit is compared to the memory on the tape and if it coincides, a hit is scored. If the hit strikes a negative target area so that it becomes a miss, it is compared to memory and scored as a miss. Thus it will be apparent from the sequence shown on the exemplary card that the location of the hit is analyzed and weighted according to the accuracy of the shot fired.

The column entitled "Alertness" is based upon the time reference of the shot with respect to the programmed scene. Thus if the trainee fires his weapon during time intervals identified in the memory system as related to the shooting time period, then his alertness with respect to this action is evaluated and recorded on a score card.

The third column entitled "Decision" evaluates the decision making ability of the trainee as to whether a shot should be fired or should not be fired. For example, a fellow officer may be participating in the scene which would require the non-firing of a shot. Thus the evaluation under the "Decision" headed column takes into account various acts occuring in the scene projected which acts bear upon the proper decision to be made. It will be readily understood that in some action scenes no shots should be fired as indicated by the score on sequence 6.

OPERATION

The above description of the apparatus embodying this invention and a method of practicing the situation-decision training contemplated herein has included certain phases of operation in order to more clearly describe the purpose of the apparatus. A more detailed description of the use of the apparatus will now be made.

It will be understood that while the apparatus has been described for use on a firing range, that preferably actual bullets fired with powder are not used, but instead a synthetic bullet made of a composition material similar to wax and propelled by a primer is used. Such a synthetic bullet and primer for target shooting is well-known and available under the trademark "Red Jet." The use of synthetic bullet is advantageous in that a synthetic bullet, upon striking the metal grid plates A'-I', shatters and the parts thereof are readily trapped within the screen means. The relative softness of the synthetic bullet reduces the damage to the screen means and provides a relatively inexpensive target practice means which does not sacrifice accuracy because the distance or range in which a trainee effectively feels and becomes a part of the scene projected is relatively close, such as from 5 to 20 feet. Thus the use of a snythetic or wax bullet propelled by primer powder and a relatively light-weight sheet steel backing for the screen means provides a relatively maintenance-free bullet stop and trap.

It will be also understood that the apparatus described above may be used with various different training procedures in order to accomplish specific training objectives. Some different types of methods of use will be mentioned and only an exemplary method will be described, however the invention is not thereby limited.

As best seen in FIG. 1 the projector means is located in a relatively low profile console so that a trainee, if he stands behind the console, will be relatively free from interference thereby. The trainee may stand at either side of the console in order to become a closer part of the scene projected and in some instances the script of the scene may require the trainee to stand toward one side of the screen or the other.

In the example shown, an instructor may be present at the master control console. The instructor may orally brief the trainee on each scene before it is projected in order to give him certain background information relevant to the forthcoming action. The instructor may control the sequence of situations in order to discuss the trainee's reaction at particular points, if desired. The method of this invention also contemplates a completely automatic system wherein the trainee in the absence of an instructor and the only person on the range may start the sequence of scenes by pressing a start button on the projector means or on the console and then taking part in each scene as it is projected. In such automatic operation of the apparatus, the motion picture film or synchronized sound track may be provided with a briefing of each scene. Such briefing would depend upon the status or stage of training of the trainee.

When the scene is projected on the screen surface 66, sound effects compatible with the scene may also be started either by means of a sound track on the film or by means of film controlled sound tape equipment so that sounds normally to be expected in the scene being projected will be heard on the training area and the trainee will feel that he is part of an actual situation instead of the simulated situation.

As the sequence of acts of the projected scene progress, the trainee in his visual observation and estimate of the sequence of acts must determine whether he should shoot or not shoot and at what target. As noted above, the film strip has already started by its code mark 192 thereon a time reference relative to the scene. When the trainee fires and his shot strikes one of the 4-inch grid plates forming the back wall of the screen means, the signal generated by bullet impact on an incremental area of screen means, when compared with the programmed scene by the memory means, will cause immediate illumination of display means to show whether or not the shot was fired too soon, during a proper time interval, or too late. If the shot was fired too soon, (time displayed at the left) then the premature reaction of the trainee must be analyzed and by comparison with other scenes having perhaps common factors therein an analysis may be made as to why the trainee fired a premature shot. If the shot was fired during the proper interval and as a result of the trainee's analysis of the situation, then the assumption is that the trainee is reacting as desired to the situation. If the shot is fired too late (time displayed at the right) then the trainee has not reacted as desired to the situation and in a comparable actual situation may be shot. In addition, the display means may show whether, at the time the shot was fired, the situation depicted was a "shoot" or "don't shoot" condition.

The projected scene as previously programmed with respect to time reference and the scene areas which represent the prime target, questionable targets and other or free target areas are compared in the memory means 35 and the results of such comparison are displayed on the display means 37 as previously described. At the same time the film strip is stopped by the film stop means described above so that the trainee is given the opportunity to immediately examine the location of the shot on the scene and the position and location of the various elements of the scene. The film strip may be stopped for a selected time interval as for example, from 2½ to 15 seconds, after which the remaining portion of the situation is projected on the screen until the end of that scene. Upon finishing the scene sequence and as encoded on the film strip, the sheet of paper forming the screen surface and which now is broken by the bullet hole is automatically wound up on the screen take-up reel by the motor means provided thereon so that an unperforated screen surface is presented for the next scene.

As the projector starts a second sequence, instructions are entered in the computer and memory means 35 for the next sequence and for display when the screen is again hit by a bullet. The digital information, or mark 192, on the film strip may also clear the memory of the previous instructions, or, in addition, the sound track of the film may be used for a commentary of the preceeding sequence or further briefing or instructions regarding the next sequence to be projected.

Slide Projector Means

The example of the invention described above utilized a motion picture projector for projecting a situation upon a screen. It will also be understood that a slide projector of 35 mm type may also be used to project situation action upon such a screen means with such a bullet grid area sensitive screen means. Such a 35 mm projector may include well-known carousal type slide cartridge adapted to automatically feed slides to the slide projector film gate at selected time intervals or at time intervals controlled by an instructor. Preferably the 35 mm projector may be mounted on a rotatable turntable of reciprocating type so that the projected image may pan the full width of the screen alternately from one side of the screen to the other. The speed of panning may vary if desired to avoid a set pattern which might be anticipated by the trainee. It will be readily apparent that a moving target may appear upon the scene which is of slightly different character than that projected by a motion picture projector.

The use of a slide projector also contemplates the automatic fading out of the projected image at the edge of the screen and the introduction of a new slide by the carousal cartridge to the projector prior to the return movement of the image on the screen. In such a slide projection arrangement, when a shot is fired, the panning motion is immediately stopped by the signal transmitted by the screen means to the computer and memory means 35. The computer and memory means may display the similar data and the analysis of the data may be similar to that as above described.

It will be understood that the images projected upon the screen may also be still target images such as bullseyes, silhouettes and the like which may be automatically programmed. Such target images may correspond in target size to a selected or desired shooting distance by means of manual or electronically operated zoom lenses provided on the 35 mm still projector means. Such zoom lenses may be driven by a suitable programmed tape means.

In some instances it is desired to study in detail a training sequence projected by the 8 mm motion picture camera. This may be readily accomplished by utilizing a slide projector which is programmed and commanded to project single slides of particular action incorporated in an 8 mm scene. For example, the frames in the shooting sequence of an 8 mm scene may require a relatively long period of study of the shooting in order to properly analyze the scene depicted and the reaction of the officer thereto.

It will also be understood that the screen means may be constructed of panorama type involving arcs of 180 degrees up to 360 degrees to simulate a three-dimensional environment. In such a screen means, only a limited portion may be used for target portion. Such target portions may be spaced about the screen means. Scenes may be projected on the 360 degree screen in a manner which is well-known from the panoramic motion picture apparatuses used at the present time. A display panel and a scoring system may be employed which includes that described above but which is amplified to account for the different effect of a situation displayed at 180 degrees or 360 degrees.

It will also be understood that while motion picture film or 35 mm film has been used as the media for providing the projected situation, that the present invention also contemplates the use of video tape and video tape projectors adapted thereto in place of the film media.

The above description of the apparatus and method of this invention shows exemplary training of security and police personnel to meet violent law-breaking situations. However, such training may also be useful in any time of alertness training where the trainee must participate as part of the action sequence shown on the screen, as for example, combat situations and hunting situations. The type of scoring an analysis which relates to the programming of the action sequence may vary with the type of action shown on the screen and may be scored to produce certain desired results.

It will be readily understood by those skilled in the art that various changes and modifications may be made in the apparatus and the method of training described above, as for example, the time reference designation may be further refined by identifying the precise moment that the weapon is first drawn by the officer in reacting to the scene such as by providing a switch means on the holster; the incremental bullet impact sensing areas on the screen means may be varied in size so that the most significant areas of the scene projected may be more precisely or more generally subject to analysis; the projector means may be modified to provide precise stopping of the film at a film frame by modifying the film advance mechanism; and the memory means may be of any well-known type adapted to receive and compare information and data with previously programmed information and data.

All such modifications and changes coming within the scope of the appended claims and falling within the spirit of this invention are embraced thereby.

We claim:

1. A method of training in aiming a weapon in which participant's response to preselected simulated situations of a selected activity is obtained, comprising the steps of:
   projecting a film having a simulated situation on a screen;
   programing said film with respect to a preplanned time reference and location of a sequence of acts displayed in said simulated situation;
   obtaining an overt physical reaction of the participant with respect to said time reference and to location of said displayed acts on said screen;
   and displaying information of the results of the obtained reaction of the participant in relation to the programmed time reference and act sequence identifying as to time and specific location the impact on any portions of said screen of a projectile released by participant.

2. In a method of training as stated in claim 1, wherein the step of displaying information with respect to the reaction of the participant includes the step of:

showing on a display panel information as to whether reaction of participant was too soon, too late, or within programmed limits, and whether the impact area in relation to the act sequence was a hit, miss, or a fault.

3. In a method as stated in claim 1 wherein the step of displaying information with respect to the reaction of the participant includes the step of:
   printing said information on a card.

4. In a method as stated in claim 1 including the step of
   preparing the participant for his role with respect to and in a simulated situation prior to projecting said situation on a screen.

5. In a method as stated in claim 1 including the step of
   comparing the reaction of the participant with respect to time and act sequence of a simulated situation with a preselected standard programmed for said film to determine alertness, proper decision, and accuracy in executing his decision.

6. In a method of training as stated in claim 1 including the step of
   providing environmental sound effects correlated with the projected act sequence for imparting audio realism to the situation to enhance realism of the role of the participant.

7. A method of training as stated in claim 1 wherein the step of displaying information relating to the reaction of the participant includes the step of
   dividing the time reference for the programmed sequence of acts in said simulated situation into a preaction period, an action period, and a post action period, and displaying the action of participant in relation thereto.

8. A method of training as stated in claim 1 wherein the step of obtaining the reaction of the participant to the sequence of acts includes the step of
   classifying the impact of a projectile released or shot by the participant onto any area of the screen as either a hit, miss or free area, the latter area permitting additional shots.

9. In a method of training as stated in claim 1 wherein the step of projecting a simulated situation on the screen includes the step of providing a plurality of sequentially arranged simulated situations, each simulated situation being different in terms of action and background environment, and requiring different reactions by participant.

10. In a method of training as stated in claim 1, including the step of:
    Stopping the film upon impact by a projectile upon any portion of the screen.

11. An apparatus for training in the aiming of a weapon so as to facilitate the determination of a trainee's alertness, accuracy, and decision making characteristics with respect to simulated situations in combination:
    a projector means;
    a film having a simulated situation recorded thereon for projection by said projector means;
    means on said film for programming each sequence of acts in said simulated situation with respect to time and projected location on a screen;
    a screen having a screen surface upon which said projector means projects said simulated situations;
    said screen including impact receiving means proximate to, substantially coextensive with and behind said screen surface responsive to an external manifestation of the reaction of the participant to the projected situation;

and actuatable circuit means at said screen cooperable with said programming means and with said responsive impact receiving means for determining the reaction of said participant with respect to alertness, decision making and accuracy code marks on said film correlated to a selected sequence of acts depicted in a scene and to a time reference.

12. In an apparatus as stated in claim 11 wherein code marks on said film providing a time reference for said sequence of acts to correlate the trainee's reaction thereto as being premature, opportune, or post action.

13. in an apparatus as stated in claim 11 wherein said film is a motion picture film.

14. In an apparatus as stated in claim 11 wherein said film includes a synchronized video tape means.

15. In an apparatus as stated in claim 11 wherein said projector means includes
means for stopping advancement of said film means in response to a projectile striking said screen responsive means;
said stopping means comprising a solenoid means and a solenoid arm;
said projector means including a pivoted and reciprocally movable claw member;
said solenoid arm being engagable with said claw member to disengage said claw member from said film means;
said solenoid means being actuated by said circuit means.

16. In an apparatus as stated in claim 15 wherein said means for stopping advancement of said film means includes:
capstan drive means for said film including a clutch means and an axially movable fly wheel engaged therewith;
and solenoid means actuated by said circuit means for disengaging said clutch means from the fly wheel by axial movement thereof upon the response of said screen to a projectile striking said screen.

17. In an apparatus as stated in claim 11 wherein said screen includes means providing a screen surface,
said screen surface being provided on a sheet of material stretched between a supply roll of said material and a take-up roll for said material, whereby a new screen surface can be selectively displayed.

18. In an apparatus as stated in claim 11 wherein said responsive impact receiving means of said screen includes:
a plurality of independently supported plates, each plate being responsive to impact of a projectile thereagainst,
each plate being correlated to a selected incremental area on the screen surface upon which time referenced act sequences of said programmed film are projected.

19. In a method of training in aiming a weapon by utilizing a projected sequence of acts observable by a trainee in a position where he may realistically participate in such act sequence, the steps of:
providing a film showing an act sequence of a simulated situation;
referencing by readable code marks on the film, the act sequence projected;
projecting said film upon a screen;
providing segmental areas substantially coextensive with and behind said screen which areas are electrically responsive to the impact of a projectile fired by said trainee;
programing the coded acts projected with reference to time and to selected segmental areas on said screen with reference to said acts;
providing a computer and memory unit operatively connected to a reader of said film code marks and to said selected segmental areas of said screen whereby the projected act sequence at a moment of time is correlated with respect to each area segment of the screen and the acts projected thereon;

comparing the programmed acts with the response of the trainee to the act sequence as shown by impact of the projectile upon an area segment;
and displaying the results of the comparison.

20. In a method as stated in claim 19 wherein the step of displaying the results of the comparison includes
displaying such comparison on an observable display panel adjacent the screen.

21. In a method as stated in claim 19 wherein the step of displaying the results of the comparison includes the step of
printing on a score card the number of shots fired, accuracy of the fired shot, alertness or time evaluation of trainee's response, and evaluation of the decision of the trainee.

* * * * *